United States Patent [19]

Nishimura et al.

[11] 4,450,719
[45] May 29, 1984

[54] AIR FLOW METER

[75] Inventors: Yutaka Nishimura; Yoshishige Ohyama; Noboru Sugiura, all of Katsuta, Japan

[73] Assignee: Hitachi, Ltd., Tokyo, Japan

[21] Appl. No.: 434,059

[22] Filed: Oct. 13, 1982

[51] Int. Cl.³ .............................................. G01F 1/68
[52] U.S. Cl. ..................................... 73/204; 73/118.1
[58] Field of Search ............................... 73/118 A, 204

[56] References Cited

U.S. PATENT DOCUMENTS

| | | | |
|---|---|---|---|
| 4,297,881 | 11/1981 | Sasayama et al. | 73/204 |
| 4,338,814 | 7/1982 | Romann | 73/204 |
| 4,341,114 | 7/1982 | Plapp | 73/204 |

Primary Examiner—Herbert Goldstein
Attorney, Agent, or Firm—Antonelli, Terry & Wands

[57] ABSTRACT

In a thermal type air flow meter, a temperature-dependent resistor for sensing the flow rate of air is placed in the flow of air to be measured, and another resistor for detecting a current flowing through the above resistor is connected in series therewith. The current is controlled so that the temperature-dependent resistor is kept at a predetermined temperature which is higher than surrounding temperature by, for example, 150° C. The resistance of the temperature-dependent resistor varies in accordance with the flow rate of air. However, since the current is controlled so that the temperature-dependent resistor is maintained at the predetermined temperature, the current varies with the flow rate of air. Accordingly, the speed of air can be obtained by measuring the current. In such an air flow meter, when a key switch of an engine is turned on to put a power supply to work, a short circuit is formed between both ends of the current detecting resistor to cause a large current to flow through the temperature-dependent resistor. Accordingly, the flow rate of air can be measured immediately after the power supply has been turned on.

10 Claims, 21 Drawing Figures

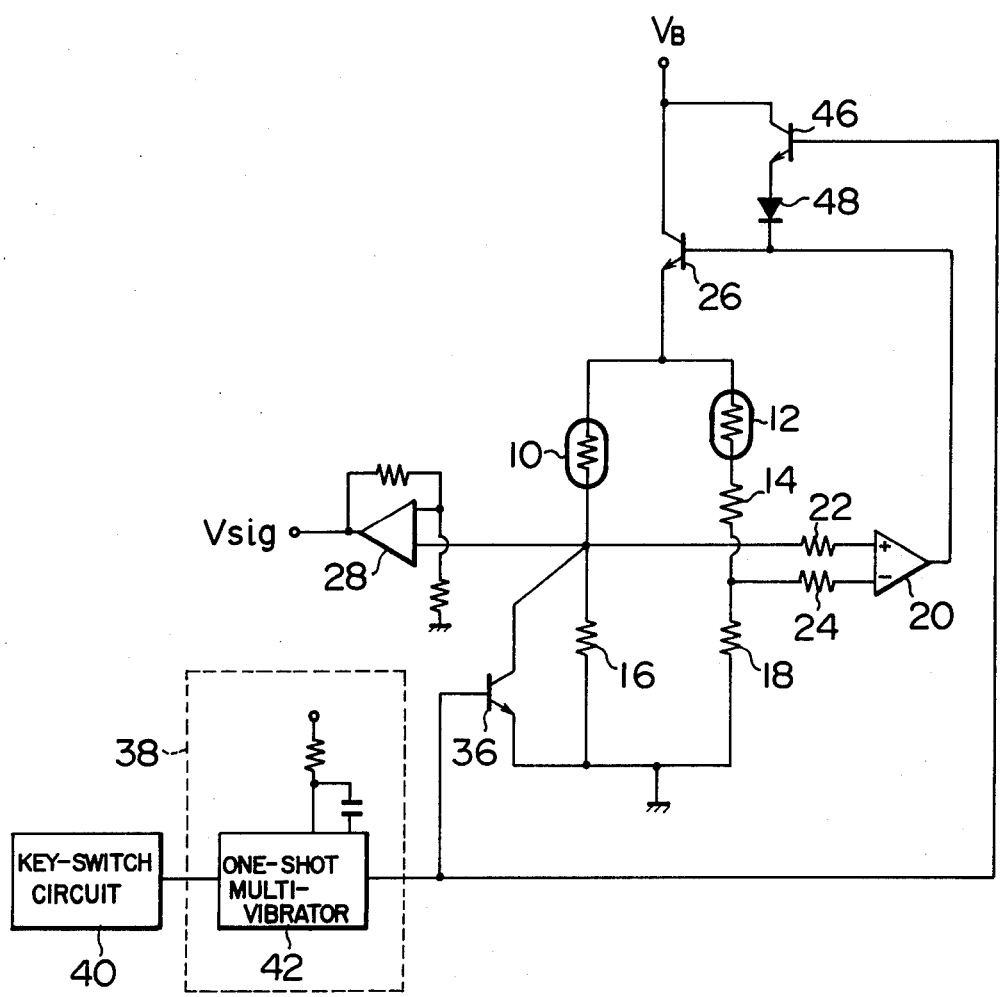
F I G. 4

AIR FLOW METER

The present invention relates to an air flow meter, and more particularly to a thermal type flow meter for measuring the intake of air of an internal combustion engine provided in an automobile.

Various flow meters have been used to measure the intake of air of an internal combustion engine. Of these flow meters, a thermal type air flow meter has been widely used since it generally has excellent response and can measure mass flow rate, that is, does not require pressure corrections. These facts are described in U.S. Pat. Nos. 3,747,577, 3,750,632 and 3,824,966.

A well-known hot-wire flow meter has a structure that a platinum wire having a diameter of 70 to 100 μm is stretched in an intake pipe to form a flow rate sensing part. In this structure, however, the durability of the flow rate sensing part is not good, and mechanical damage to the sensing part readily occurs due to the backfire produced when something is wrong with the internal combustion engine.

In order to overcome such difficulties, U.S. Pat. No. 4,264,961 assigned to the present assignee discloses a flow rate sensing part in which a platinum wire is wound on a supporting body such as a hollow ceramic body and then coated with a coating material. In the sensing part having such a structure, the hollow ceramic body acting as the supporting body has a large heat capacity, and therefore a time necessary for the sensing part to reach a state in which it is allowed to measure the flow rate of air, after a power supply has been turned on (hereinafter referred to as a "warming-up time") becomes long. Specifically, at low temperatures, a battery voltage is reduced and the warming-up time becomes longer. Further, not only in the wire-wound type sensing part but also in a hot-film type sensing part which is recently tried, there arises a problem that the warming-up time becomes long due to the heat capacity of the sensing part.

It is accordingly an object of the present invention to provide an air flow meter which is short in warming-up time and can measure the flow rate of air immediately after a power supply has been turned on.

In an air flow meter according to the present invention, a resistor connected in series with a flow rate sensing resistor is short-circuited for a predetermined time after a power supply has been turned on, to cause a large current to flow through the flow rate sensing resistor, thereby heating it quickly.

The present invention will be apparent from the following detailed description taken in conjunction with the accompanying drawings, in which:

FIG. 4 is a circuit diagram of another embodiment of the present invention;

Now, an embodiment of the present invention will be explained below, with reference to the drawings.

Figure 1:
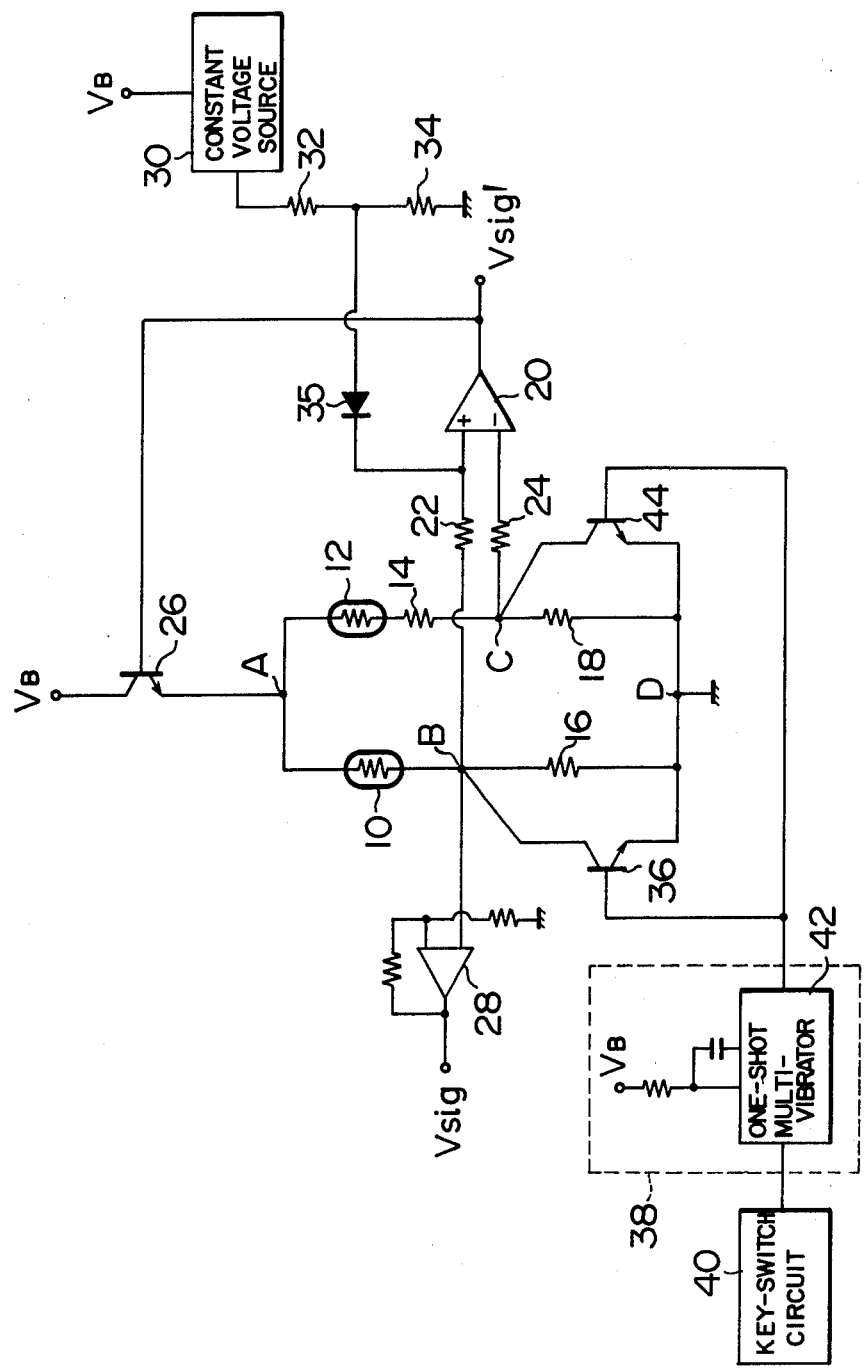
FIG. 1 is a circuit diagram of an embodiment of the present invention.

In FIG. 1, reference numeral 10 designates a flow rate sensing probe, and 12 a temperature compensation probe. Each of the probes 10 and 12 is formed by winding a platinum with around a ceramic bobbin. The probes 10 and 12 make up a Wheatstone bridge circuit together with resistors 14, 16 and 18. A voltage $V_B$ of a power supply such as a car battery is applied through transistor 26 between the junction A of the probes 10 and 12 and the junction D of the resistors 16 and 18. The voltage $V_B$ is applied after the key switch of an automobile has been turned on. The junction B of the probe 10 and resistor 16 and the junction C of the resistors 14 and 18 are connected to input terminals of a differential amplifier 20 through resistors 22 and 24, respectively. The output of the differential amplifier 20 is supplied to the base of a transistor 26. The amplifier 20 delivers the output for controlling the transistor 26 so that a difference in potential between the two input terminals of the differential amplifier 20 becomes equal to zero. As a result, the flow rate sensing probe 10 is kept at a constant temperature, which is higher than surrounding temperature by about 150° C. The temperature compensation probe 12 is used to detect surrounding temperature. A difference between the temperature of flow rate sensing probe 10 and surrounding temperature is kept constant by using the temperature compensation probe 12. When the flow rate of air increases by way of example, the flow rate sensing probe 10 is cooled. As a result, the resistance of the flow rate sensing probe 10 is decreased, and the Wheatstone bridge is unbalanced. A current flowing through the flow rate sensing probe 10 is increased so that the Wheatstone bridge is rebalanced. Accordingly, the flow rate of air is proportional to the current flowing through the probe 10. The junction B of the probe 10 and resistor 16 is connected to an amplifier 28, which delivers an output voltage developed across the resistor 16. Since the resistance of the resistor 16 is constant, the output voltage of the amplifier 28 indicates a current flowing through the resistor 16, namely, the current flowing through the probe 10. Further, the output of the amplifier 20 is proportional to the current flowing through probe 10, and therefore the flow rate of air is also indicated by the output of the amplifier 20.

Further, the output of a constant voltage source 30 which is applied with the battery voltage $V_B$ after the key switch has been turned on, is divided into two voltage parts by resistors 32 and 34. The junction of the resistors 32 and 34 is connected to a positive input terminal of the amplifier 20 through a diode 35. These circuit elements 30, 32, 34 and 35 make up a starting-up circuit of the flow meter. That is, when the key switch of the automobile is turned on, the transistor 26 is in the OFF-state and therefore no current flows through the probes 10 and 12 and resistors 14, 16 and 18. Accordingly, the Wheatstone bridge is balanced, and the output of the amplifier 20 is kept at zero. By applying a constant voltage to the positive input terminal of the amplifier 20 through the diode 35, the Wheatstone bridge is forced to be unbalanced, in order to start the flow meter. For example, the output voltage of the constant voltage source 30 is 5 V, and the voltage at the junction of the resistors 32 and 34 is about 0.9 V. Since the voltage drop across the diode 35 is about 0.6 V, a voltage of about 0.3 V is applied to the positive input terminal of the amplifier. When the flow meter is in operation, the voltage at the junction B of the probe 10 and resistor 16 is about 1.5 V for the flow rate of air equal to 0 m/s, and is 2.7 V for a maximum flow rate of air. Accordingly, after the flow meter has been started up, the voltage applied to the positive input terminal of the amplifier 20 is always higher than 0.3 V, and the diode 35 is reverse-biased. Thus, the starting-up circuit causes no error from the constant voltage source in measuring the flow rate of air.

Figure 2:
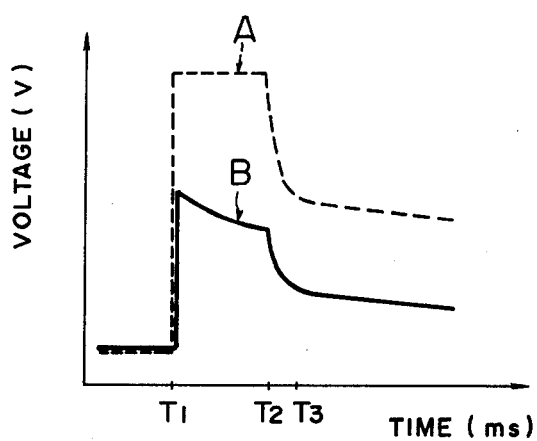
FIG. 2 is a signal waveform chart for explaining the operation of a conventional air flow meter.

In the above-mentioned circuit configuration, the voltage at the junction A of the transistor 26 and probe 10 and the voltage at the junction B of the probe 10 and resistor 16 have such waveforms as shown in FIG. 2, when the flow meter is started up. That is, at a time $T_1$ when the power supply is turned on and the voltage $V_B$ is supplied to the flow meter, both the voltages at the junctions A and B increase in an instant. At the time $T_1$, the temperature of the probe 10 is equal to normal temperature, and the resistance of the probe 10 is about 20 $\Omega$. Then, the probe is heated gradually, and the resistance thereof is increased. Since the voltage at the junction A is kept constant and a ratio of the voltage across the probe 10 to the voltage across the resistor 16 varies gradually, the voltage at the junction B varies gradually for a period between the time $T_1$ and a time $T_2$. At the time $T_2$, when the Wheatstone bridge circuit becomes balanced, the temperature of the probe 10 becomes higher than normal temperature by about 150° C., and the temperature distribution in the probe 10 is uniform. Then, the temperature distribution in the probe 10 varies gradually till a time $T_3$ so that the temperature of a central portion of the probe 10 is high and the temperature of both ends of the probe 10 is low, and becomes stable at the time $T_3$. A period between the time $T_1$ and time $T_2$ is called the warming-up time. In this period, the probe 10 is not heated to a temperature at which the flow rate of air can be measured. The voltage appearing at the junction B in a period between the time $T_1$ and time $T_2$ is higher than a voltage at the junction B corresponding to the maximum flow rate of air, and therefore it is judged by a microprocessor mounted in an automobile that an engine is put in an air-rich state. Thus, the amount of injected fuel becomes more than enough, which stops the engine.

Now, the embodiment of the present invention for solving the above problem will be explained on the basis of FIG. 1. The junction B of the probe 10 and resistor 16 is connected to the collector of a transistor 36, the emitter of which is grounded. The emitter of the transistor 36 is supplied with a pulse having a predetermined time width (namely, pulse duration) from a timer circuit 38. The timer circuit 38 is operated by a signal from a key-switch circuit 40 for the engine. When the key switch is turned on to start the engine, the key-switch circuit 40 delivers the above signal. The timer circuit 38 is formed of, for example, a one-shot multivibrator 42, and delivers the pulse having the predetermined width when the signal from the key-switch circuit 40 is supplied to the circuit 38. The transistor 36 is made conductive by the pulse from the timer circuit 38, to short the resistor 16. The above-mentioned circuit elements 36, 38 and 40 make up a circuit for shortening the warming-up time.

Figure 3:
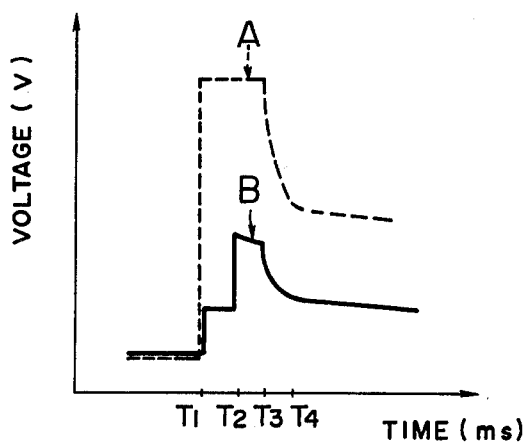
FIG. 3 is a signal waveform chart for explaining the operation of the embodiment shown in FIG. 1.

Next, explanation will be made on the operation of the circuit for shortening the warming-up time. Now, let us consider the case where the voltage at the junction A is 5 V and the probe 10 and resistor 16 have a resistance of 20 $\Omega$. When the transistor 36 is in the OFF-state, a voltage of 2.5 V is applied between both ends of the probe 10. On the other hand, when the transistor 36 is put in the ON-state to short the resistor 16, a voltage of about 5 V is applied across the probe 10, and therefore the probe 10 is heated quickly. FIG. 3 shows such an operation. Referring to FIG. 3, the transistor 36 is kept at the ON-state for a period between a time $T_1$ and a time $T_2$. During this period, the voltage at the junction B is kept at a constant value which corresponds to the voltage drop across the transistor 36. The probe 10 is heated rapidly, and therefore a period between the time $T_1$ and a time $T_3$ at which the temperature of the probe 10 reaches a predetermined value, is shorter than the period between the time $T_1$ and time $T_2$ shown in FIG. 2. That is, a warming-up time which is indicated in FIG. 3 by a period between the time $T_1$ and a time $T_3$, is shorter as compared with the warming-up time shown in FIG. 2.

Next, explanation will be made of a transistor 44, which serves as an additional starting-up circuit. That is, at a time just after a starting voltage has been applied to the bridge circuit through the diode 35 to start up the flow meter, the voltage at the junction B is about 0 V and the voltage at the positive input terminal of the amplifier 20 is about 0.3 V. On the other hand, the voltage at the junction A is 5 V. Now, let us assume that the voltage at the junction C of the resistors 14 and 18 is 2.5 V. Then, the voltage at the negative input terminal of the amplifier 20 is 2.5 V. Accordingly, the voltage applied to the negative input terminal is higher than the voltage applied to the positive input terminal, and the output of the amplifier 20 becomes zero. Thus, the operation of the flow meter is stopped. However, by putting the transistors 36 and 44 in the ON-state at the same time, the negative input terminal of the amplifier 20 is applied with about 0 V immediately after the flow meter has been started up. Thus, the starting-up operation can be continued.

FIG. 4 shows another embodiment of the present invention. In FIGS. 1 and 4, like reference numerals designate like parts and elements. The embodiment shown in FIG. 4 differs from that shown in FIG. 1 in the circuit configuration of starting-up circuit. That is, a series combination of a transistor 46 and a diode 48 is connected between the collector and base of the transistor 26, and the base of the transistor 46 is connected to the timer circuit 38. Accordingly, when the key switch is turned on, the transistor 46 is made conductive by the output pulse from the timer circuit 38. Accordingly, the transistor 26 is made conductive, and the flow meter is started. When the flow meter has been started up, the diode 48 is reverse-biased, preventing the transistor 46 from being damaged.

Figure 5:
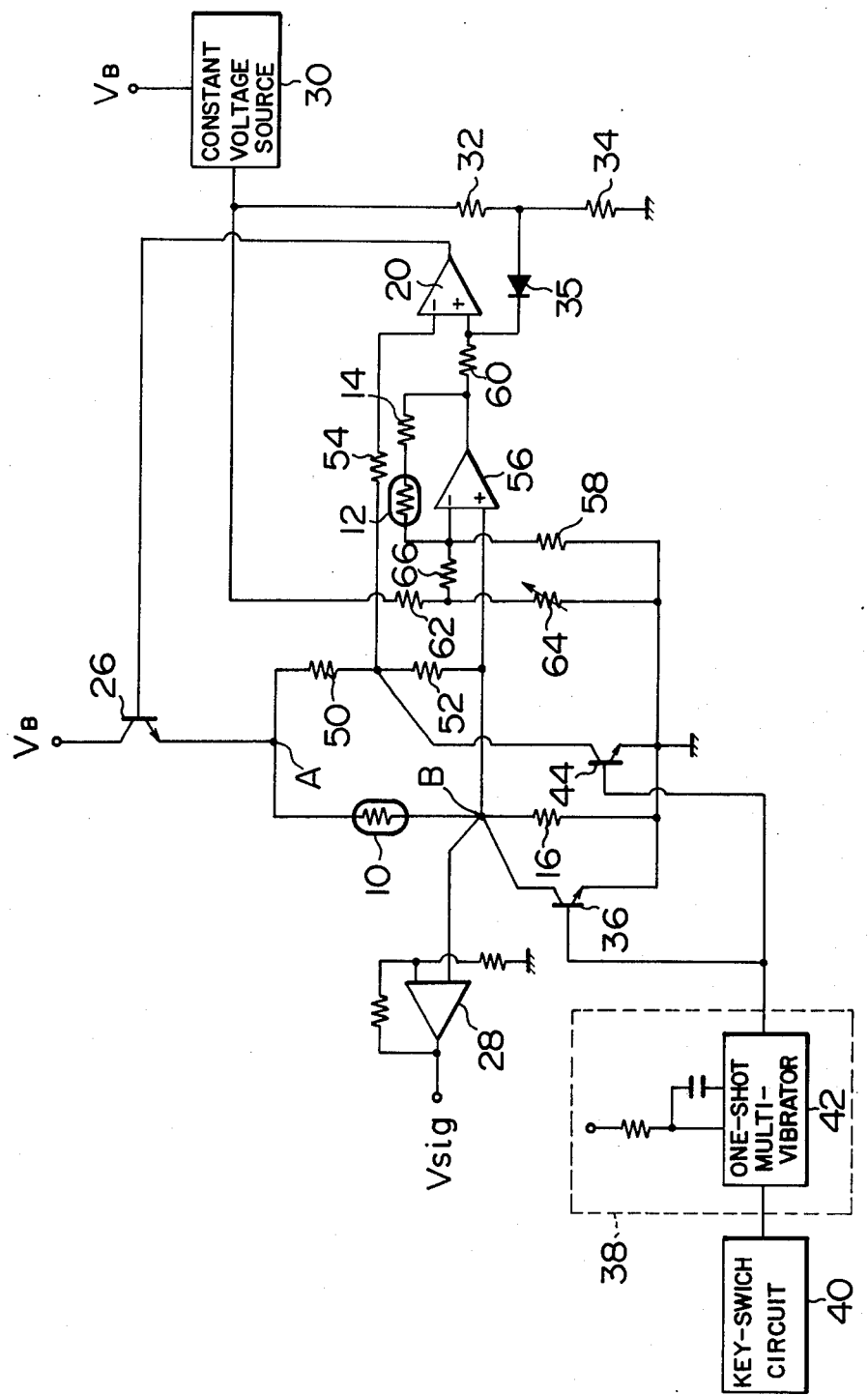
FIG. 5 is a circuit diagram of a further embodiment of the present invention.

FIG. 5 shows a further embodiment of the present invention. The present embodiment does not include the Wheatstone bridge circuit shown in FIG. 1, and a basic operation of the present embodiment is described in U.S. Pat. No. 4,297,881. Referring to FIG. 5, a voltage developed across the probe 10 is divided by resistors 50 and 52 into two voltage parts, one of which is applied to the negative input terminal of the amplifier 20 through a resistor 54, and a series combination of the temperature compensation probe 12 and resistor 14 is used as a feedback resistance of an amplifier 56. The negative input terminal of the amplifier 56 is grounded through a resistor 58, and the output terminal of the amplifier 56 is connected to the positive input terminal of the amplifier 20. Accordingly, the amplifier 20 delivers an output so that the above-mentioned voltage part of the voltage across the probe 10 is equal to the voltage across the series combination of the probe 12 and resistor 14. When the key switch is turned on, the transistor 36 shorts the resistor 16 to heat the probe 10 rapidly, and the junction of the resistors 50 and 52 is grounded to make the voltage at the negative input terminal of the amplifier 20 nearly equal to 0 V, thereby causing the starting operation to continue. Further, a series combination of a resistor 62 and a variable resistor 64 is connected to the constant voltage source 30, and the junction of the resistors 62 and 64 is connected to the negative input terminal of the amplifier 56 through a resistor 66. The resistors 62, 64 and 66 are used for offset adjustment.

Figure 6:
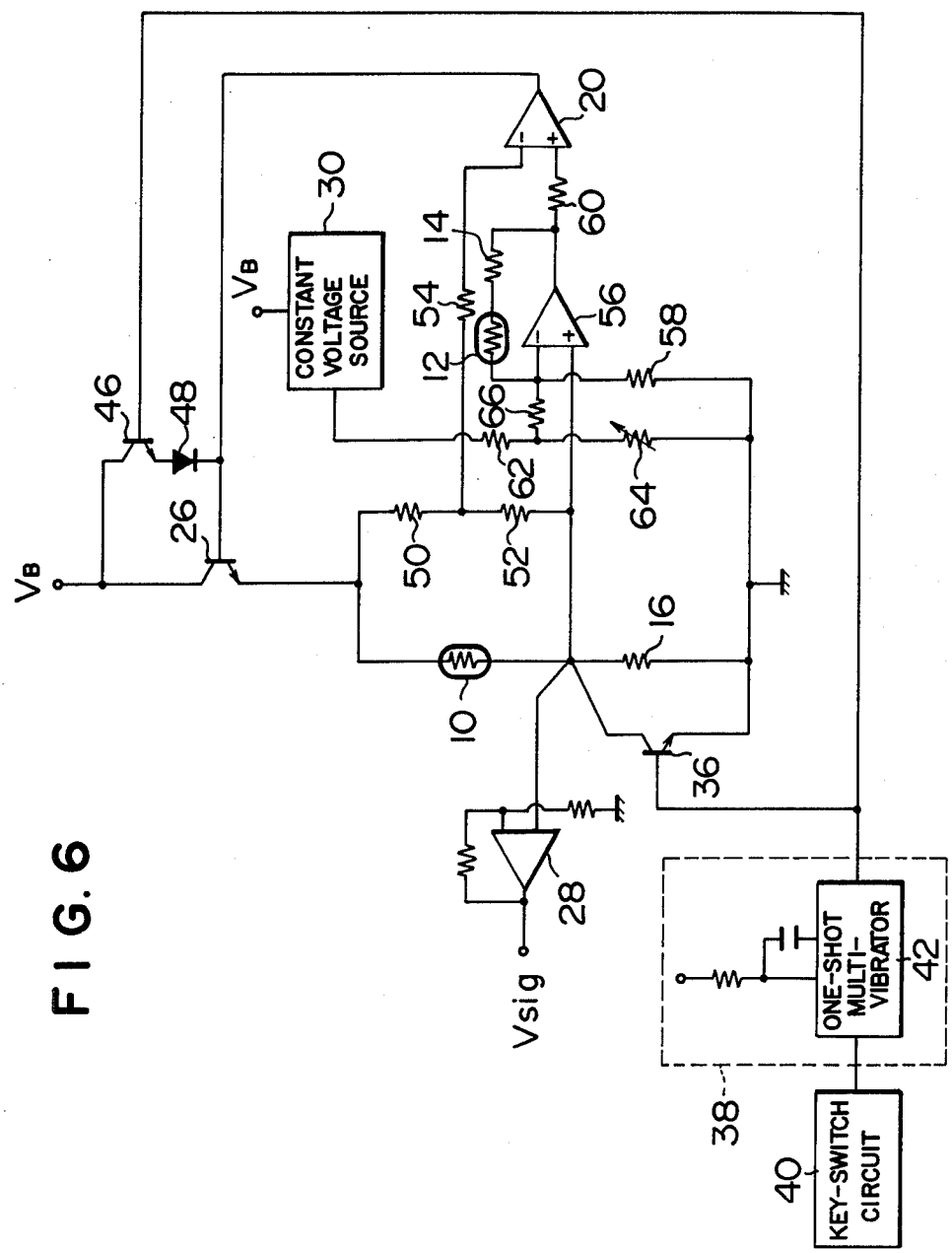
FIG. 6 is a circuit diagram of still another embodiment of the present invention.

FIG. 6 shows still another embodiment of the present invention. In FIGS. 5 and 6, like reference numerals designate like parts and elements. The embodiment shown in FIG. 6 differs from that shown in FIG. 5 in that the series combination of the transistor 46 and diode 48 is connected between the collector and base of the transistor 26, and the transistor 46 is made conductive by the output signal from the timer circuit 38 to make the transistor 26 conductive, thereby starting the flow meter.

Figure 7:
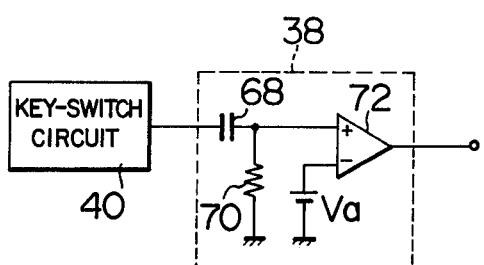
FIG. 7 is a detailed circuit diagram showing a circuit part of the embodiments shown in FIGS. 1, 4, 5 and 6.
Figure 8:
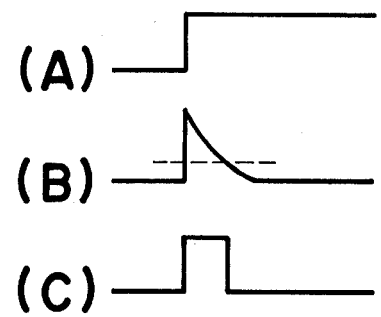
FIG. 8 is a signal waveform chart for explaining the operation of the circuit part shown in FIG. 7.

In the above-mentioned embodiments, the timer circuit 38 is formed of the one-shot multivibrator 42. However, a timer circuit shown in FIG. 7 can perform the same function as the above-mentioned one-shot multivibrator. That is, the output of the key-switch circuit 40 (having a waveform A shown in FIG. 8) is differentiated by a differentiating circuit made up of a capacitor 68 and a resistor 70 to obtain an output signal having a waveform B shown in FIG. 8. The output signal is compared with a constant voltage $V_a$ by a comparator 72 to obtain an output having a waveform C shown in FIG. 8. This output is applied to the transistor 36 and others.

Figure 9:
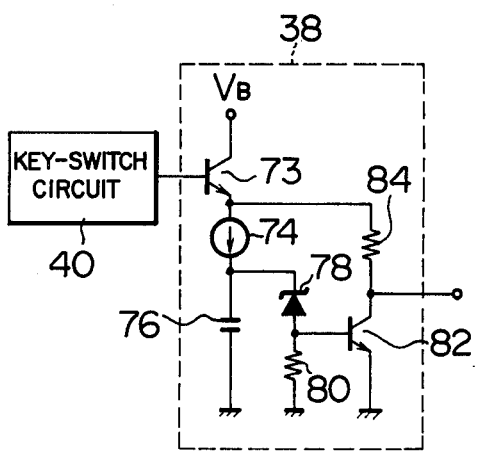
FIG. 9 is another detailed circuit diagram showing a circuit part of the embodiments shown in FIGS. 1, 4, 5 and 6.
Figure 10:
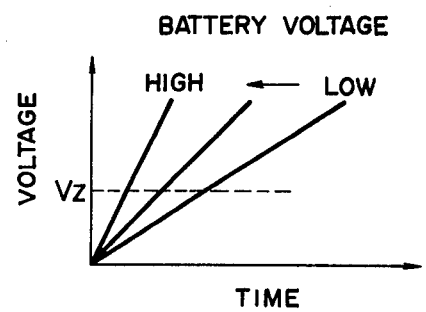
FIGS. 10 and 11 are graphs for explaining the operation of the circuit part shown in FIG. 9.
Figure 11:
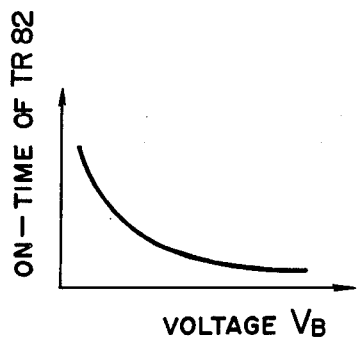

Now, let us consider a time necessary for a hot-wire flow meter to reach a state in which the flow rate of air can be measured, after the power supply of the flow meter has been turned on. When the quantity from a flow rate sensing probe to air is neglected, a time $t$ taken to heat the probe from a temperature $\theta_0$ to a temperature $\theta_1$ is given by the following formulae:

$$t = (\theta_1 - \theta_0) \cdot \frac{R}{V^2} \cdot \pi r_o^2 l C_p \rho \propto \frac{1}{V_o^2}$$

where R indicates the resistance of the probe, V the potential difference between both ends of the probe, $V_0$ the supply voltage, and $\pi r_o^2 l C_p \rho$ the heat capacity of the probe. Accordingly, it is most desirable to make a short-circuiting time, during which a fixed resistor connected in series with the probe is shorted, inversely proportional to the square of the supply voltage $V_o$. A timer circuit shown in FIG. 9 has been constructed on the basis of the above fact. Referring to FIG. 9, a transistor 73 is made conductive by the output signal from the key-switch circuit 40, and a circuit 74 for generating a constant current proportional to an applied voltage supplies electric charge to a capacitor 76. The electric charge on the capacitor 76 flows through a zener diode 78 and a resistor 80, and a base current of a transistor 82 flows from the junction of the diode 78 and resistor 80. A series combination of a resistor 84 and the transistor 82 is connected to the input side of the circuit 74, and the junction of the resistor 84 and transistor 82 is connected to the base of the transistor 36 acting as a switching transistor. In this case, the voltage at the junction of the circuit 74 and capacitor 76 varies with the voltage of the power supply (namely, the battery voltage) as shown in FIG. 10, and the transistor 82 is made conductive, that is, turned on when the voltage at the above-mentioned junction exceeds a threshold voltage $V_Z$ of the zener diode 78. Accordingly, the ON-time of the switching transistor 36 is determined in accordance with the battery voltage. Thus, even when the battery voltage is decreased, the warming-up time is shortened by making large the width of pulse applied to the transistor 36.

Figure 12:
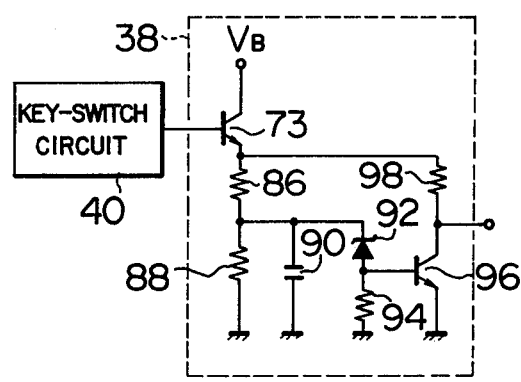
FIG. 12 is a further detailed circuit diagram showing a circuit part of the embodiments shown in FIGS. 1, 4, 5 and 6.
Figure 13:
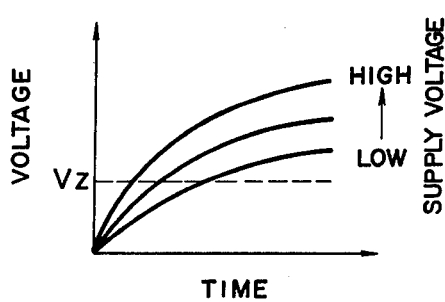
FIGS. 13 and 14 are graphs for explaining the operation of the circuit part shown in FIG. 12.
Figure 14:
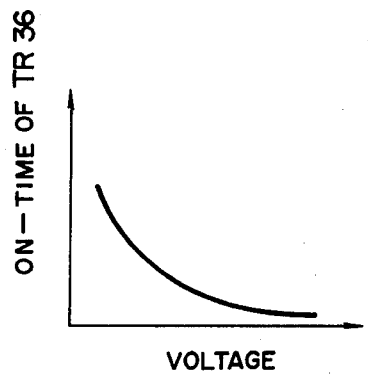

Further, a timer circuit shown in FIG. 12 may be used. Referring to FIG. 12, a series combination of resistors 86 and 88 is connected to the power supply having the supply voltage $V_B$, to divide the supply voltage $V_B$ by the resistors 86 and 88 into two voltage parts, one of which is applied to a capacitor 90 to supply electric charge to the capacitor 90. The electric charge on the capacitor 90 flows through a zener diode 92 and a resistor 94, and a current flows from the junction of the diode 92 and resistor 94 to the base of a transistor 96. A series combination of a resistor 98 and the transistor 96 is connected to the power supply, and the junction of the resistor 98 and transistor 96 is connected to the base of the transistor 36 (acting as a switching transistor). In this case, the voltage at the junction of the zener diode 92 and capacitor 90 varies with the supply voltage as shown in FIG. 13, and the transistor 96 (acting as a switching transistor) is turned on when the voltage at the above junction exceeds a threshold voltage $V_Z$ of the zener diode 92. Accordingly, the ON-time of the transistor 36 is determined in accordance with the voltage of the power supply.

Figure 15:
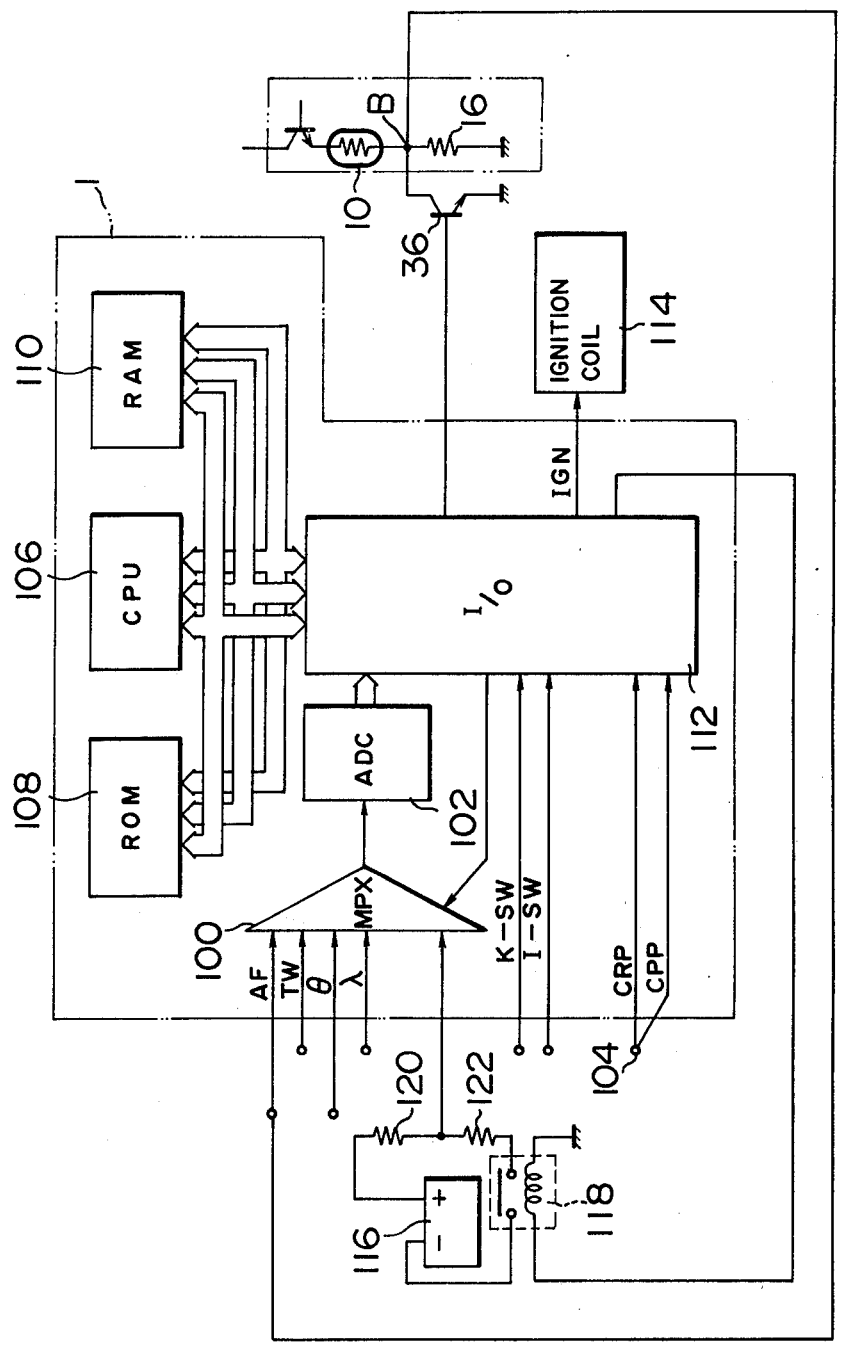
FIG. 15 is a block diagram showing an engine control system, in which the embodiments shown in FIGS. 1, 4, 5 and 6 are used.

FIG. 15 shows in detail a computer for controlling the engine of a motor car. Referring to FIG. 15, the intake of air AF, the temperature TW of cooling water for cooling the engine, the opening $\theta$ of a throttle valve, the output $\lambda$ of an $O_2$ sensor, and others are input signals.

These analog signals, for example the AF from the point B in FIG. 15, are applied to a multiplexer 100 to be outputted in a time-divisional fashion, and then sent to an analog-digital converter 102 to be converted into digital signals. Further, for example, a signal K-SW from the key switch of the engine and a signal I-SW from an idling switch, each of which is an ON-OFF signal, are applied to the computer and treated as a one-bit digital signal. Further, pulse train signals from a crank angle sensor 104 such as crank reference pulses CRP and crank position pulses CPP are applied to the computer. In FIG. 15, a CPU 106 indicates a central processing unit for performing digital operations, an ROM 108 a memory for storing control programs and fixed data, an RAM 110 a writable memory, and an I/O 112 an input-output unit for sending the signals from the analog-digital converter 102, switches and sensor 104 to the CPU 106 and for sending a signal from the CPU 106 to an ignition coil 114.

An electromagnetic relay 118 connected to a battery 116 is kept at the ON-state for a predetermined time by the signal K-SW from the key switch, and the voltage $V_o$ at the junction of resistors 120 and 122 is applied to the multiplexer 100. Using the voltage $V_o$ at the above junction, a time T is calculated from an equation $T = K/V_o^2$ (where K is a constant). A pulse is formed which has a pulse width equal to the time T. The transistor 36 is turned on by this pulse, and the fixed resistor connected in series with the probe is shorted for the time T.

Figure 16:
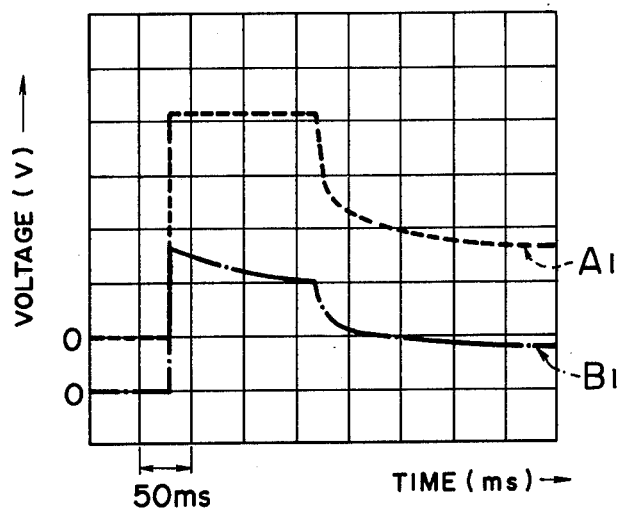
FIG. 16 is a graph showing signal waveforms obtained in a conventional manner.
Figure 17:
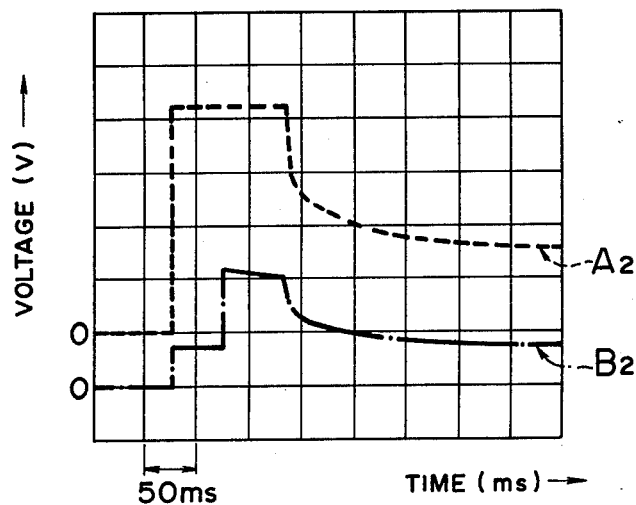
FIGS. 17, 18 and 19 are graphs showing signal waveforms obtained by the embodiment shown in FIG. 5 in accordance with the present invention.
Figure 18:
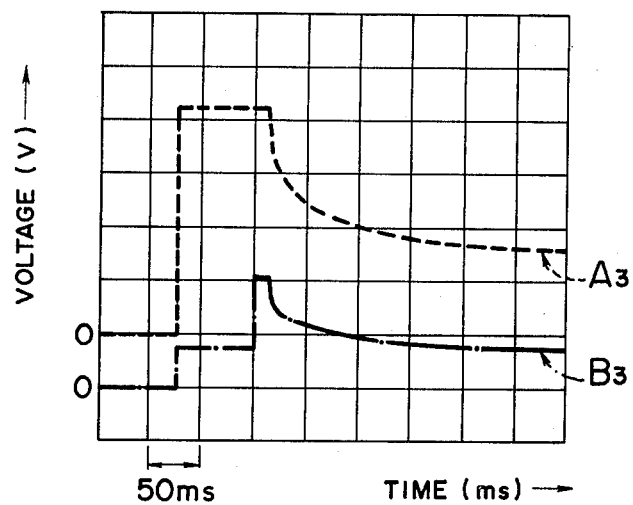
Figure 19:
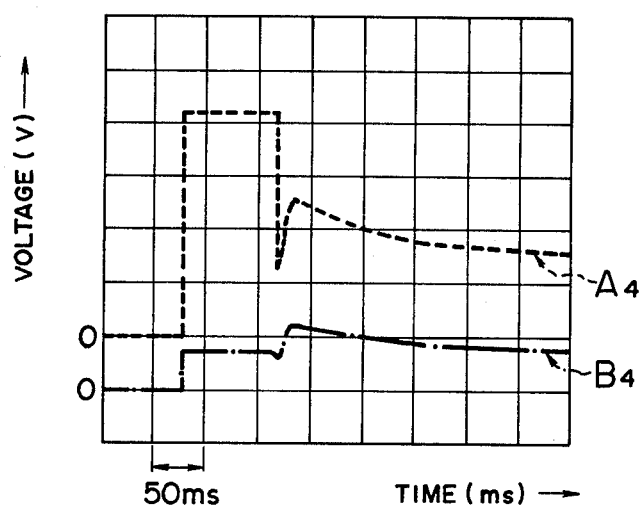

FIGS. 16 to 19 are signal waveform charts showing the results of an experiment which was made using an air flow meter according to the present invention. The signal waveforms were observed by a synchroscope, the circuit shown in FIG. 5 was used in the experiment, and the voltage at the junction A of the probe 10 and transistor 26 and the voltage at the junction B of the probe 10 and resistor 16 were observed. In each of FIGS. 16 to 19, one division on abscissa indicates 50 ms, and one division on ordinate indicates 2 V for the voltage at the junction A and 1 V for the voltage at the junction B. Further, in this experiment, the voltage of the power supply was 12 V. FIG. 16 shows voltage waveforms which were obtained when the short-circuiting time of the transistor 36 was zero. The waveforms shown in FIG. 17 correspond to a short-circuiting time of 50 ms, those shown in FIG. 18 a short-circuiting time of 80 ms, and those shown in FIG. 19 a short-circuiting time of 90 ms. FIG. 16 shows that the warming-up time was about 150 ms. While, each of FIGS. 17 to 19 shows that the warming-up time was about 100 ms. That is, the warming-up time is shortened by the present invention. The above-mentioned experiment was carried out with a normal supply voltage of 12 V. However, when surrounding temperature is much reduced, the supply voltage (namely, the battery voltage) may be decreased to about 6 V. That is, the battery voltage is one-half the normal voltage, and electric power for heating the probe is one-fourth a normal value. Accordingly, the warming-up time becomes longer. In such a case, the shortened warming-up time by the present invention is more effective.

Figure 20:
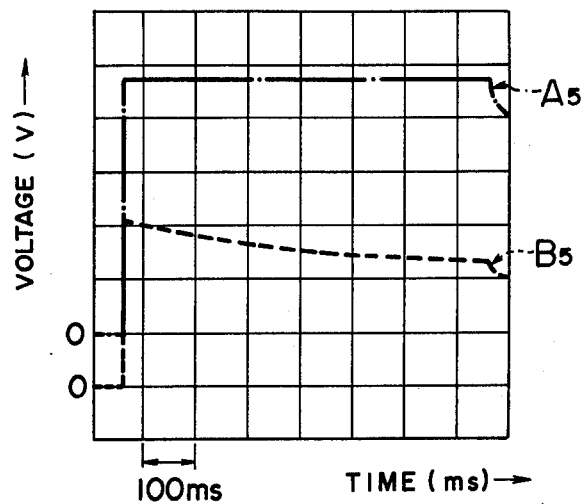
FIG. 20 is a graph showing signal waveforms obtained in a conventional manner.
Figure 21:
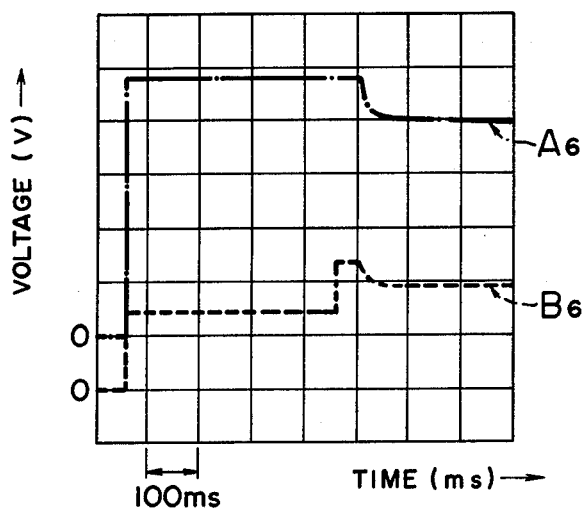
FIG. 21 is a graph showing signal waveforms obtained by the embodiment shown in FIG. 5 in accordance with the present invention.

FIGS. 20 and 21 show voltage waveforms which were obtained when the supply voltage (namely, battery voltage) was 8 V. In each of FIGS. 20 and 21, one division on abscissa indicates 100 ms, and one division on ordinate indicates 1 V for the voltage at the junction A and 0.5 V for the voltage at the junction B. FIG. 20 shows voltage waveforms which were obtained when the short-circuiting time of the transistor 36 was zero, and indicates that the warming-up time was about 700 ms. FIG. 21 shows voltage waveforms which were obtained when the short-circuiting time was 400 ms, and indicates that the warming-up time was about 450 ms.

What is claimed is:

1. An air flow meter including a first resistor whose resistance varies with temperature, a second resistor connected in series with said first resistor, and control means for controlling a current flowing through said first resistor so that said first resistor has a predetermined temperature, to measure the flow rate of air by said current flowing through said first resistor, said air flow meter comprising means for forming a short circuit between both ends of said second resistor for a predetermined time, when said air flow meter is energized.

2. An air flow meter according to claim 1, wherein said means for forming a short circuit includes means for generating a pulse having a predetermined time width when said air flow meter is energized, and means receiving said pulse for forming said short circuit between both ends of said second resistor for a time equal to said time width.

3. An air flow meter according to claim 2, wherein the pulse width of said pulse generated by said pulse generating means varies with a supply voltage, and the pulse width of said pulse is large as the supply voltage is lower.

4. An air flow meter according to claim 1, wherein said control means includes a third resistor having a resistance varying with temperature for detecting ambient temperature and a fourth resistor connected in series with said third resistor to form a bridge circuit using said first, second, third and fourth resistors, and includes means for generating an output so that a voltage at a junction of said first and second resistors becomes equal to a voltage at a junction of said third and fourth resistors, and means for changing said current flowing through said first resistor in accordance with said output of said output generating means.

5. An air flow meter according to claim 4, further comprising means for applying a predetermined voltage to said junction of said first and second resistor, and means for forming a short circuit between both ends of said fourth resistor for a predetermined time, when said air flow meter is energized.

6. An air flow meter according to claim 4, further comprising means for maintaining said output of said output generating means at a predetermined value for a predetermined time, when said air flow meter is energized.

7. An air flow meter according to claim 1, wherein said control means includes means for dividing a voltage developed across said first resistor into two voltage parts, a third resistor having a resistance varying with temperature for detecting ambient temperature, means for generating an output so that one of said two voltage parts obtained by said voltage dividing means becomes equal to a voltage developed across said third resistor, and means for changing said current flowing through said first resistor in accordance with said output of said output generating means.

8. An air flow meter according to claim 7, further comprising means for applying a predetermined voltage to the output side of said third resistor, and means for grounding a voltage dividing point of said voltage dividing means for a predetermined time, when said air flow meter is energized.

9. An air flow meter according to claim 7, further comprising means for maintaining said output of said output generating means at a predetermined value for a predetermined time, when said air flow meter is energized.

10. An air flow meter comprising:
a flow rate sensing probe;
a resistor connected in series with said flow rate sensing probe;
a power supply for applying a voltage to a series combination of said flow rate sensing probe and said resistor;
a voltage dividing circuit for dividing a voltage developed across said flow rate sensing probe into two voltage parts;
a temperature compensation probe;
means for comparing one of said voltage parts obtained by said voltage dividing means with a voltage developed across a temperature compensation circuit to generate an output in accordance with a difference between said voltage part and said voltage developed across said temperature compensation circuit;
means for controlling a current supplied from said power supply to said series combination;
means detecting a voltage at a junction of said flow rate sensing probe and said resistor for outputting said detected voltage as a flow rate indicating signal;
a key switch for permitting or preventing the supply of a voltage from said power supply to said series combination;
means for outputting a pulse having a predetermined width in response to the turning-on of said key switch; and
means receiving said pulse for grounding said junction of said flow rate sensing probe and said resistor.

* * * * *